United States Patent

[11] 3,626,082

| [72] | Inventors | Kenji Kasai<br>Tokyo;<br>Nobunori Kuroki, Saitama-ken; Takaji Takei; Sigeru Kanda, both of Kanagawa-ken, all of Japan |
|---|---|---|
| [21] | Appl. No. | 830,906 |
| [22] | Filed | May 2, 1969 |
| [45] | Patented | Dec. 7, 1971 |
| [73] | Assignees | Furukawa Denki Kogyo Kabushiki Kaisha<br>Tokyo, ;<br>Kajima Corporation<br>Tokyo, Japan |
| [32] | Priorities | May 30, 1968 |
| [33] | | Japan |
| [31] | | 43/44439;<br>Nov. 25, 1968, Japan, No. 43/102115; Dec. 18, 1968, Japan, No. 43/92327 |

[54] CORRUGATED PIPE BUSLINE
5 Claims, 7 Drawing Figs.

[52] U.S. Cl.................................................... 174/72 R,
174/49, 174/70 R, 174/74 R, 174/100, 254/134.3 R, 307/147
[51] Int. Cl......................................................... H02g 3/00, H02g 1/00
[50] Field of Search........................................ 174/28, 48, 49, 68, 68 B, 70, 70 B, 70.3, 71, 71 B, 72, 72 B, 74, 100, 102.6, 126.3, 131, 131.2; 307/147; 317/122; 29/429, 433; 254/134.3

[56] References Cited
UNITED STATES PATENTS

| 2,852,597 | 9/1958 | Raydt et al.................. | 174/102.6 UX |
| 3,004,175 | 10/1961 | Weiss........................... | 307/147 |

FOREIGN PATENTS

| 1,046,712 | 12/1958 | Germany...................... | 174/100 |
| 1,140,618 | 12/1962 | Germany...................... | 174/72 |
| 401,082 | 11/1933 | Great Britain................ | 174/28 |

OTHER REFERENCES

Advertising leaflet (one page) published by Modern Suppliers, Inc. of New York, N.Y. and entitled " Senion Powercrat at Work on Empire State Building- 1951." Received in U.S. Pat. Office on Feb. 8, 1957.

Advertising leaflet (one page) published by Modern Suppliers, Inc. of New York, N.Y. and entitled " Powercrat at Work on the Famous 44 Story 1407 Broadway Building, New York City." Received in U.S. Pat. Office on Feb. 8, 1957.

*Primary Examiner*—Laramie E. Askin
*Attorney*—George B. Oujevolk

ABSTRACT: A long corrugated pipe bus conductor to be laid vertically in a high-storied building has the conductors of branching lines bonded thereto at predetermined intervals. The interval may be so selected as to correspond to the height of one story of the building. Each of the branching lines leads to an electrical equipment such as a switchboard on each story.

PATENTED DEC 7 1971
3,626,082
SHEET 1 OF 3
FIG. 1
FIG. 2
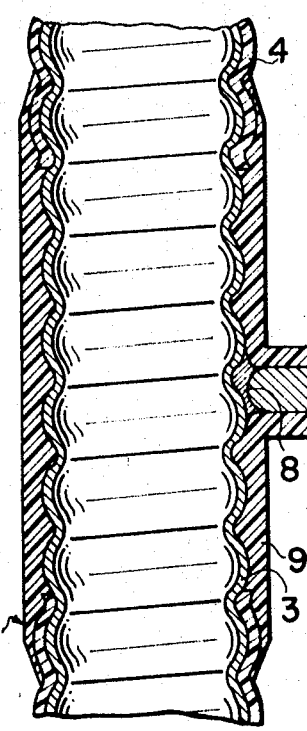
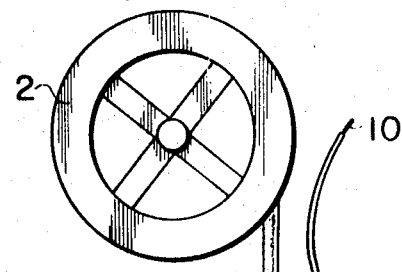
INVENTOR
Kenji Kasai
Nobumu Kuroki
Takaji Taker
Sugeru Kando
BY
ATTORNEY

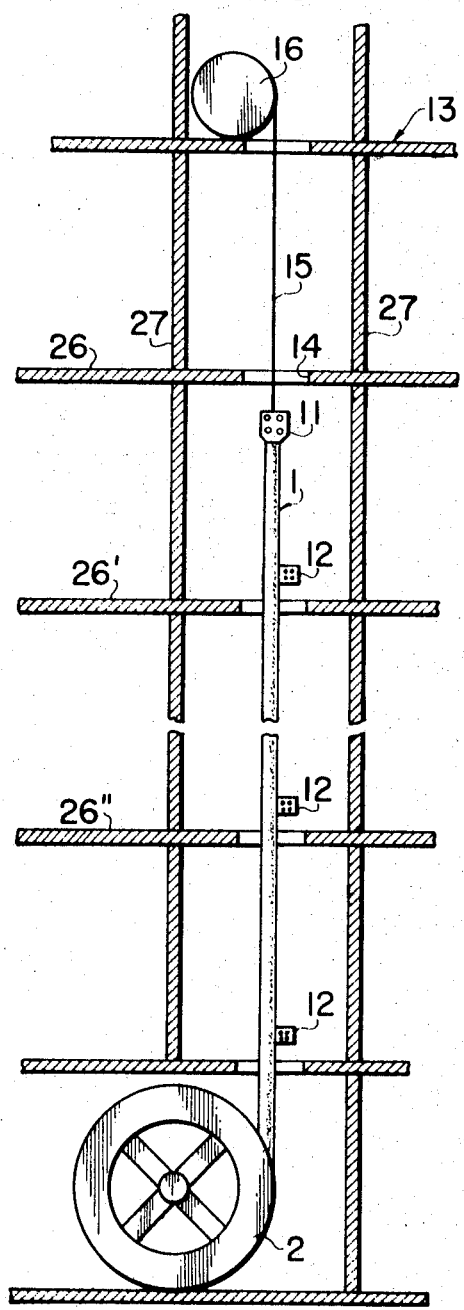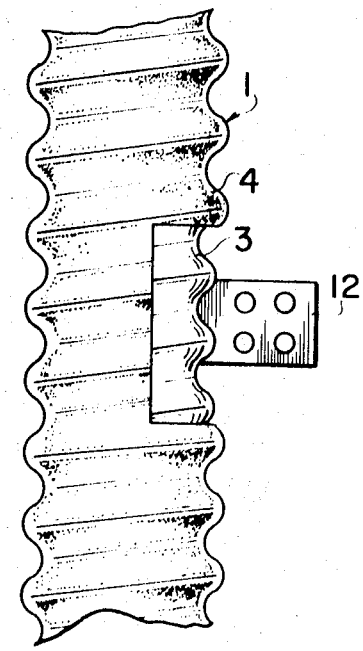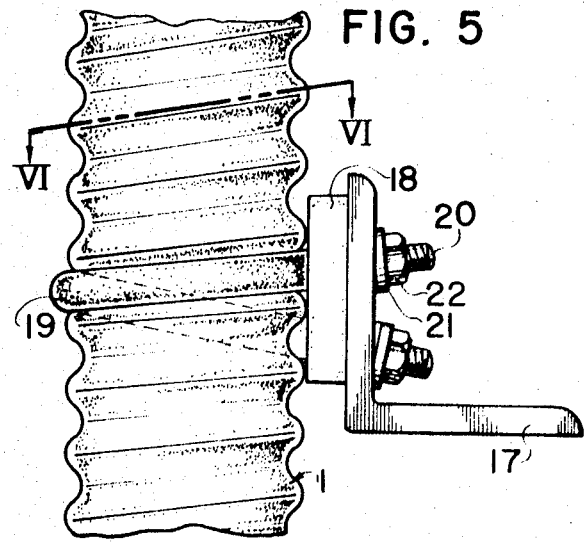

# CORRUGATED PIPE BUSLINE

BACKGROUND OF THE INVENTION

The present invention relates to a corrugated pipe busline adapted for power distribution in a high-storied building.

For power distribution in such a high-storied building there have been used various busline systems. For example, solid pipe bus conductors, whose length corresponds substantially to the height of one story of the buildings, are mounted as a set in the shaft of the building. Each bus conductor of one set is then connected to the corresponding conductor of another set. At the same time, branching lines leading to an electric equipment on each story are connected to the bus conductors of each set. This requires a troublesome work of connection. An entrance to the shaft for carrying the set of bus conductor also must be provided on each story.

It is also a conventional practice to pull armored cables of a suitable length into the shaft of the building. However, owing to the armor for sustaining the weight of the cable conductor, it is impossible to branch the lines. Such a system therefore has a disadvantage of requiring as many cables as the stories of the building where they are installed with branch lines.

A bus duct system requires measures for compensating either thermal expansion of the duct itself or relative shift of the position of individual sections due to, for example, earthquake.

The present invention proposes a new and improved busline in which the above disadvantages are obviated.

SUMMARY OF THE INVENTION

In accordance with the invention, a long corrugated pipe bus conductor to be laid in the shaft of a high-storied building has branching conductors bonded thereto at predetermined intervals in the longitudinal direction thereof. In case of an insulated corrugated bus, the insulating layer is removed at the bonding portions. The exposed conductor at the bonding portion is again covered with an insulating layer after bonding. The assembly work is done in the workshop. The thus-assembled bus is then wound on a cable drum and carried to a building in which it is to be laid. The bus may be then pulled into the shaft and be connected to electric equipments on the respective stories of the building through the branching conductors. Thus no work of bonding branching lines to the busline is required at the place of installation.

BRIEF DESCRIPTION OF THE DRAWING

In the accompanying drawings:

FIG. 1 illustrates schematically a corrugated busline pulled off from a cable drum;

FIG. 2 is an enlarged longitudinal section of the bonding portion of the busline in FIG. 1;

FIG. 3 shows laying of the busline in the shaft of a high-storied building;

FIG. 4 is another embodiment similar to FIG. 2;

FIG. 5 shows a clamping means of the busline;

In the drawings throughout, corresponding parts are denoted with the same reference characters.

DESCRIPTION OF THE PREFERRED EMBODIMENTS

Figure 6:
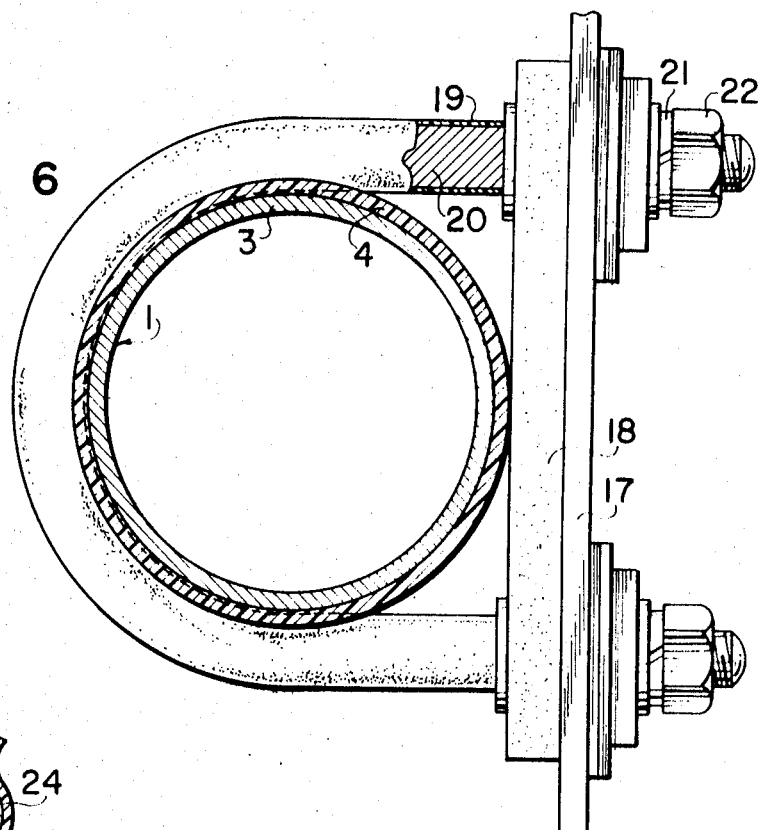
FIG. 6 shows a cross-sectional view of a clamping means with respect to the line VI—VI in FIG. 5.

In FIG. 1 there is shown a corrugated pipe busline 1 pulled off from a cable drum 2 for vertical laying. The corrugated pipe busline 1 is composed of a helically corrugated conductor pipe 3 of copper or aluminum, covered with an insulating layer 4 of heatproof polyvinyl chloride or the like. The busline 1 is stripped of its insulating layer 4 longitudinally at intervals corresponding to, for example, the height of one story of a high-storied building, as shown in FIG. 2. Connected to the bare portions 10 of the busline 1 are relatively short branch lines 5 composed of stranded conductor 6 of copper or aluminum and an insulating layer thereon. For this purpose, an end of the branch line 5 is bared and then its conductor 6 is bonded at 8 to the surface of each bare portion of the busline 1 by welding or soldering. The exposed corrugated conductor 3 as well as the conductor 6 is then covered with an insulating material 9 such as heatproof polyvinyl chloride by, for example, molding. The free end of each branch line 5 may be connected to electric equipment such as a switchboard (not shown) installed on each story of the building. To at least one end of the busline 1 there are connected terminal plates 11 for power feeding, one of which is shown in FIG. 1. In cases where the length of the busline 1 to be laid vertically is enough to cover the overall height of the building, the terminal plate 11 may be provided only at one end of the busline 1. On the contrary, in cases where the overall height of the building is more than the length of the busline 1 so that buslines must be connected in series, both ends of each busline must be provided with such terminal plates. The connection of the branch lines as well as the terminal plates to the busline may be preliminarily done in the workshop, and the thus-assembled busline, wound on a cable drum, may be easily transported to a building in which it is to be laid.

In FIGS. 3 and 4 a corrugated pipe busline 1 extending vertically is connected with branch terminal plates 12 instead of the branch lines 5.

In a similar way to FIGS. 1 and 2, the busline 1 is stripped of its insulating layer 4 at desired intervals, and the bare conductor 3 is bonded to the branch terminal plate 12. The exposed conductor may also be covered with a suitable insulating layer. To each of the branch terminal plates 12 there may be connected a cable leading to electric equipment (not shown) on the floor of each story 26, 26' or 26" of a high-storied building 13.

The laying of the busline 1 will be apparent from FIG. 3: A cable drum 2, with the assembled busline 1 wound thereon, is carried to the bottom of a power distribution shaft 14 partitioned by walls 27 of the building 13 and rotatably supported. A messenger wire 15 is joined to the terminal plate at the free end of the busline 1. By winding up the messenger wire 15 by means of a reel or winch 16 at the top of the shaft 14, the busline 1 is pulled off from the cable drum 2 and up in the shaft 14. The necessary number of buslines may be pulled in the shaft in a similar manner.

The busline 1 may be supported in the shaft 14 by means of clamp members, one of which is illustrated in FIGS. 5 and 6. The clamp member has at least one U-shaped bolt 20 covered with an insulating layer 19. The bolt 20 embraces the busline 1 in such a manner that its circular arc portion extends along a part of the helical valley of the corrugated busline, and passes through an angle member 17 secured in the shaft. By tightening up nuts 22 on washers 21 engaging with the threaded legs of the bolt 20, the busline 1 is fastened against the angle member 17. An insulating plate 18 may be interposed between the busline 1 and the angle member 17 for protection of the busline from injury.

Figure 7:
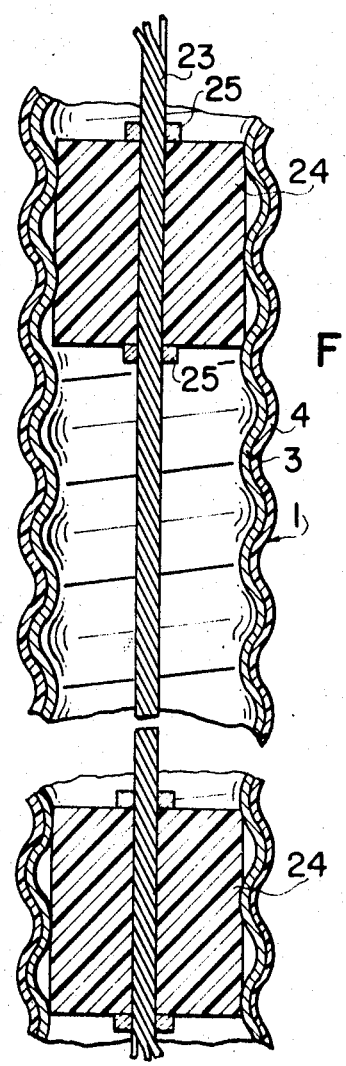
FIG. 7 is a longitudinal section of another construction of the busline.

The corrugated busline as described above, when laid vertically, might elongate longitudinally owing to its own weight. In order to avoid this there is used a reinforcing wire 23 such as a steel wire, as shown in FIG. 7. The reinforcing wire 23 is arranged axially in the corrugated pipeline 1 over its entire length and fitted thereon with retaining members 24 made of insulating hard rubber or plastics at regular intervals. Each retaining member 24 is held in its axial position by means of stop rings 25 on both end faces thereof. The retaining member 24 engages with the busline 1 so that the helical valley of the corrugation of the busline thrusts into the outer surface of the retaining member. Thus the relative position between the corrugated busline 1 and the reinforcing wire 23 remains invariable so that the amount of elongation of the busline 1 laid vertically may be kept very small. Branch lines or terminals can also be connected at predetermined intervals to the busline 1 in a similar way to the above embodiments.

It will be seen that the present invention proposes a new and improved corrugated pipe busline comprising branch lines or terminals which may be easily bonded in the workshop, before installation. Such a structure of the busline insures the easiness of the work of laying in a high-storied building and, therefore, lower costs of laying. Moreover, because of its corrugated pipe construction, the busline of the present invention has outstanding flexibility and can therefore be transported on a drum. It is also given no undue strain even when subjected, after being laid, to thermal expansion, earthquakes, and others. It can be firmly held, free from any vertical movement, by means of U-bolts, etc., applied to the valleys of its corrugation. Insulation of the branching portions of a busline as at 7 eliminates the possibility of electric shock and of electric leak.

While there have been described specific embodiments of the present invention, it will be, of course, understood that various changes may be made without departing from the spirit and the scope of the invention.

What is claimed is:

1. A corrugated busline to be laid vertically in a high storied building comprising: a flexible long pipe conductor having a corrugated inner and outer surface, an insulating layer coated on said outer surface of said conductor, said insulating layer having a corrugated outer surface similar to said conductor and being bare at intervals corresponding in spacing to each story of the building in the longitudinal direction of said conductor, flexible electric branching wires bonded to said flexible conductor at the bare portions thereof, and an insulating layer totally covering each of the exposed conductors and the bared area of said bonding portions.

2. A corrugated bus line to be laid vertically in a high storied building comprising: a long flexible pipe conductor having a corrugated inner and outer surface and branching conductors bonded to said flexible pipe conductor at an interval corresponding in spacing to each story of the building, an elongated reinforcing wire arranged axially in said conductor through the entire length thereof, said pipe conductor being retained to said wire by means of retaining members arranged at intervals in said pipe.

3. A corrugated bus line as defined in claim 2, and further including an insulating layer coated on said outer surface of said conductor, said layer having a corrugated outer surface similar to said conductor and being bare at spaced intervals for reception of said branching conductors, and an insulating layer covering said bonded portion.

4. A corrugated bus line as defined in claim 3 wherein said branching conductors are terminal plates.

5. A corrugated pipe bus line according to claim 2, wherein said pipe conductor is provided at least at one end thereof with a terminal connector for power feeding.

* * * * *